US010542380B2

(12) United States Patent
Hurewitz et al.

(10) Patent No.: US 10,542,380 B2
(45) Date of Patent: Jan. 21, 2020

(54) BEACON-BASED MEDIA NETWORK

(71) Applicant: BBY SOLUTIONS, INC., Richfield, MN (US)

(72) Inventors: Matthew Hurewitz, Minneapolis, MN (US); William Don Wortley, Minneapolis, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 982 days.

(21) Appl. No.: 14/610,605

(22) Filed: Jan. 30, 2015

(65) Prior Publication Data

US 2016/0227359 A1 Aug. 4, 2016

(51) Int. Cl.
*G06Q 30/00* (2012.01)
*H04W 4/029* (2018.01)
*G06Q 30/02* (2012.01)

(52) U.S. Cl.
CPC ............ *H04W 4/029* (2018.02); *G06Q 30/02* (2013.01); *G06Q 30/0261* (2013.01); *G06Q 30/0267* (2013.01); *G06Q 30/0269* (2013.01); *G06Q 30/0277* (2013.01)

(58) Field of Classification Search
CPC . G06Q 30/0277; G06Q 30/0269; G06Q 30/02
See application file for complete search history.

(56) References Cited

U.S. PATENT DOCUMENTS

| 7,240,360 | B1* | 7/2007 | Phan ...................... G06F 21/82 726/2 |
| 7,623,033 | B2 | 11/2009 | Ainsworth et al. |
| 8,393,532 | B2 | 3/2013 | Cato et al. |
| 8,751,298 | B1* | 6/2014 | Giordano ........... G06Q 30/0233 705/14.26 |
| 9,204,251 | B1* | 12/2015 | Mendelson ............... G08G 1/14 |
| 9,213,675 | B1* | 12/2015 | Kolton .................... H04W 4/21 |
| 2003/0163427 | A1* | 8/2003 | Fung ...................... G06Q 30/02 705/51 |

(Continued)

OTHER PUBLICATIONS

Satoh; A Location Model for Pervasive Computing Environment; IEEE Conf; 2005.*

(Continued)

*Primary Examiner* — Luis A Brown
*Assistant Examiner* — Radu Andrei
(74) *Attorney, Agent, or Firm* — Schwegman Lundberg & Woessner, P.A.

(57) ABSTRACT

Techniques and system configurations for providing content to a mobile device based on activity in a physical commercial environment such as a retail store are described herein. Mobile devices that are operated by an associated customer may be tracked with the use of beacons to determine customer activities in the retail store, including particular areas visited in the store, activities conducted by the customer in the store, and like tracking information. The customer activity and data for the activities and locations in the physical environment may be correlated to an identifier, profile, or other tracking information. This tracking information may be subsequently used by the mobile device to identify the user to an advertising network, or other information service, and obtain customized media content and information.

22 Claims, 10 Drawing Sheets

(56) References Cited

U.S. PATENT DOCUMENTS

| | | | |
|---|---|---|---|
| 2004/0033777 A1* | 2/2004 | Farineau | H04H 60/46 455/3.02 |
| 2008/0133373 A1* | 6/2008 | Perdomo | G06Q 20/20 705/18 |
| 2008/0189170 A1 | 8/2008 | Ramachandra | |
| 2011/0011931 A1* | 1/2011 | Farley | G06Q 20/20 235/382.5 |
| 2011/0149934 A1 | 6/2011 | Dickson, Jr. et al. | |
| 2013/0205020 A1 | 8/2013 | Broda et al. | |
| 2013/0304536 A1 | 11/2013 | Hamachi et al. | |
| 2014/0274135 A1* | 9/2014 | Edge | H04W 4/021 455/456.2 |
| 2014/0279014 A1* | 9/2014 | Roka | G06Q 30/0261 705/14.58 |
| 2014/0365334 A1 | 12/2014 | Hurewitz | |
| 2015/0006243 A1* | 1/2015 | Yuasa | G06Q 30/0201 705/7.29 |
| 2015/0088676 A1* | 3/2015 | Elliott | G06Q 20/202 705/21 |
| 2015/0149313 A1* | 5/2015 | Bacher | G06Q 20/425 705/24 |
| 2015/0186908 A1* | 7/2015 | Taskin | G06Q 30/0204 705/7.33 |
| 2015/0220934 A1* | 8/2015 | Chauhan | G06Q 30/012 705/17 |
| 2015/0332258 A1* | 11/2015 | Kurabi | G06Q 20/401 705/71 |
| 2015/0356660 A1* | 12/2015 | L'Heureux | G06Q 30/0631 705/14.53 |
| 2015/0356668 A1* | 12/2015 | L'Heureux | G06Q 30/0641 705/27.1 |
| 2016/0071115 A1* | 3/2016 | Oh | G06Q 20/202 705/7.29 |
| 2016/0292707 A1* | 10/2016 | Blandin | G06Q 50/30 |

OTHER PUBLICATIONS

Satoh; A Testing Framework for Mobile Computing Software; IEEE Conf. 2003.*

"All About Cookies FAQs", [online]. [retrieved on Apr. 6, 2015]. Retrieved from the Internet: <URL: http://www.allaboutcookies.org/faqs/beacons.html>, 1 pg.

"Attention, Shoppers: Store Is Tracking Your Cell", [online]. © 2015 The New York Times Company. [retrieved on Apr. 6, 2015]. Retrieved from the Internet: <URL: http://www.nytimes.com/2013/07/15/business/attention-shopper-stores-are-tracking-your-cell.html?pagewanted=all&_r=0>, (Jul. 14, 2013), 4 pgs.

"Customers hate in-store tracking (but retailers, startups and investors love it)", [online]. Fortune.com [retrieved on Apr. 6, 2015]. Retrieved from the Internet: <URL http://fortune.com/2014/03/24/consumers-hate-in-store-tracking-but-retailers-startups-and-investors-love-it/>, (Mar. 24, 2014), 4 pgs.

"How tracking customers in-store will soon be the norm", [online]. The Guardian. [retrieved on Apr. 6, 2015]. Retrieved from the Internet: <URL: http://www.theguardian.com/technology/datablog/2014/jan/10/how-tracking-customers-in-store-will-soon-be-the-norm>, (Jan. 10, 2014), 5 pgs.

* cited by examiner

BEACON-BASED MEDIA NETWORK

RELATED APPLICATIONS

This patent application is related to: U.S. patent application Ser. No. 14/180,484, titled "Retail Customer Service Interaction System and Method," filed on Feb. 2, 2014; and U.S. patent application Ser. No. 14/031,113, titled "Retail Customer Service Interaction System and Method," filed on Sep. 19, 2013; each of which is incorporated by reference herein in its entirety.

TECHNICAL FIELD

Embodiments pertain to mobile device tracking and information system processing activities. Some embodiments pertain to techniques to track and correlate mobile device activity (and related customer activity) at physical locations to later activities and uses of the mobile device.

BACKGROUND

Many retailers of goods and services maintain real-world (e.g., physical "brick-and-mortar") stores to market goods and services to customers. Customer shopping activity in the real-world store may include a variety of customer behaviors that occur prior to, during, or after a purchase of the item. Such customer behavior may include product evaluation and comparisons, product uses and demonstrations, discussions of products with other customers or employees, and other types of shopping activity. Additionally, for some of these customer visits to a real-world store, no purchase activity will occur.

Various techniques exist for tracking the number of customers that enter a store, and in some cases, tracking whether a particular customer enters a particular store location. Such techniques, however, often fail to track or measure the interactions and type of activity that these customers have within particular sections of the store, or the specific items, brands, or types of products that a particular customer is interested in. Likewise, existing customer tracking techniques are typically limited to storing basic records of customer purchase activity, and such tracking techniques often fail to collect useful data that records the type and location of other customer activity within a store. Many of the customer activities that occur in a real-world retail setting, including product browsing and in-store product interactions, are not observed or monitored.

DETAILED DESCRIPTION

Figure 1:
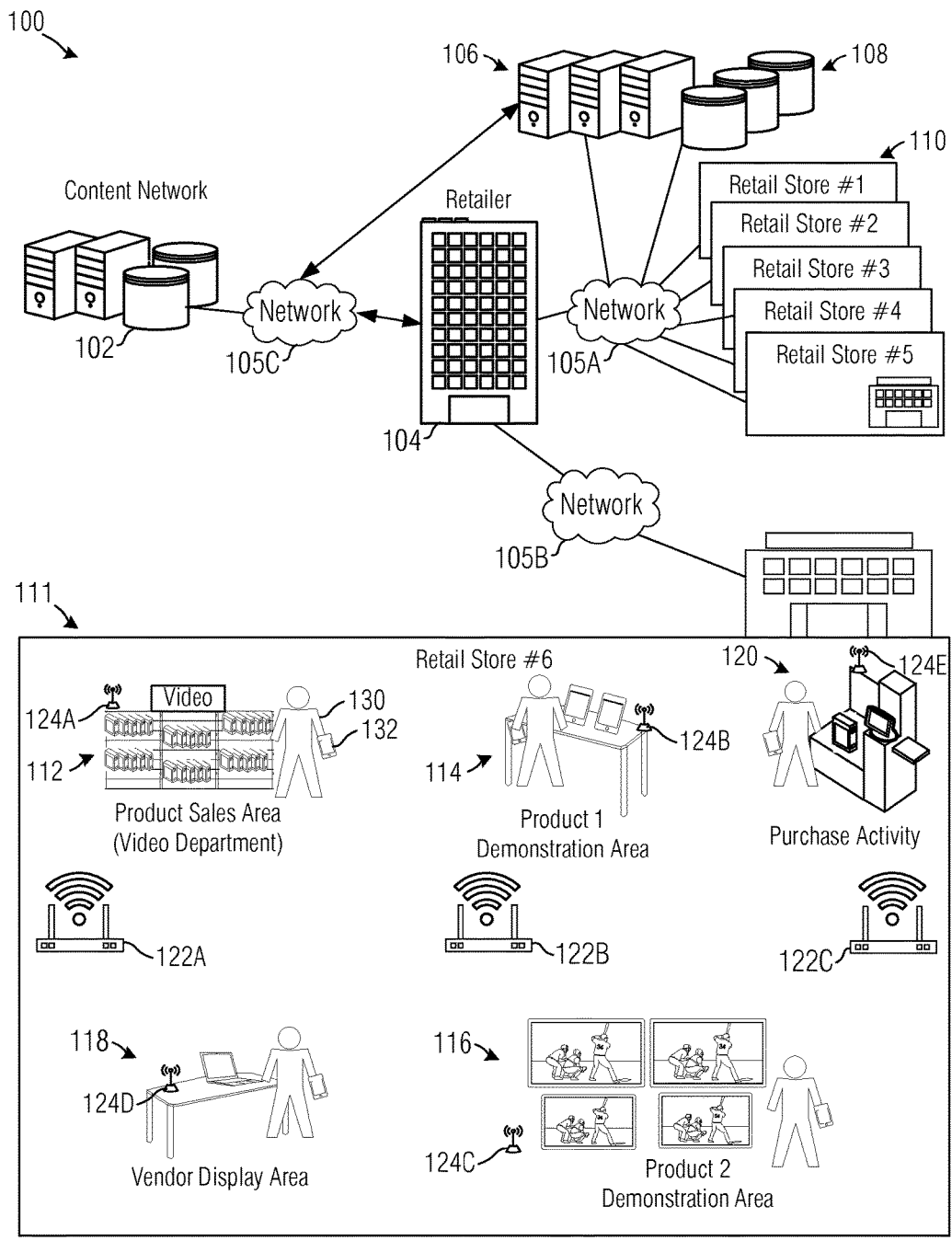
FIG. 1 illustrates tracked customer interactions in a real-world retail environment according to an example described herein.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some of the examples discussed herein are directed to techniques that enable tracking and identification of real-world customer activities in commerce settings. These customer activities are tracked and identified for correlation with subsequent content delivery from a media delivery system. In one example, the described techniques enable a commercial entity (e.g., a retailer) to collect and process useful commerce information from the activity of individual users that occurs in a store or other retail environment. This useful commerce information may be collected and processed for the retrieval and delivery of other information, such as advertisements and other media content, which are selected on the basis of certain types of real-world customer activities.

In some of the examples further described herein, software applications ("apps") executing on a mobile computing device may interact with one or a plurality of beacons in a tracked environment. As the user's mobile computing device navigates among the locations in the tracked environment, the mobile computing device interacts with different beacons deployed at known locations in the tracked environment. This interaction with the beacons is tracked in the form of a "cookie", token, session identifier, or other data maintained for (or by) the mobile computing device. At a later time, media content is selected for the mobile computing device based on the tracked interaction with the beacons. Specifically, media content may be selected for the mobile computing device based on the visited locations of the respective beacons and the brand or type of products, services activities, and the like that are nearby (e.g., proximate) to the visited locations of the respective beacons.

As a simple example, consider a scenario where a customer with a mobile computing device (e.g., a smartphone) enters into a retail store featuring a plurality of store departments. The customer conducts shopping activity including browsing throughout multiple departments of the store, but spends the majority of the time in the home theater section reviewing televisions. The beacons that are located throughout the store correspond to respective departments of the store and specific product displays within the departments of the store. The customer's proximity to a particular beacon at a known location of the television display within the home theater section is tracked by the mobile computing device (or, tracked by the beacon). As customer navigates to other areas of the store, the mobile computing device interacts with other beacons. The navigation and activity information of the customer's mobile computing device within the store is maintained on the mobile device, or with a tracking system connected to the mobile device or the beacons.

Continuing this example, at a later time, the customer launches a software application which accesses a media content network (offering advertising media content, for example). The media content network utilizes the tracking information of the particular mobile device obtained from the tracking system, which has stored data for last interaction of the customer in the retail store (e.g., indicating a large amount of time that the customer spent inside the home theater section reviewing televisions). The media content network then selects and provides advertisements on the basis of this activity (such as advertisements for particular brands featured in the home theater section), on the basis of related activity (such as advertisements for products related to the television) or on the basis of related user profile information (such as advertisements suited to a certain demographic of shoppers for home theater equipment and televisions).

As will be further explained below, these tracking and media delivery examples may be further integrated with the use of multiple software applications on the mobile computing device, with the use of beacon-based advertising networks, and with the use of customer profiling and tracking systems. Further, the tracking techniques described herein may be integrated with client-side operations to maintain location identifiers and user profile information from user activity, or the tracking techniques may be integrated with system-side operations to track device identifiers, customer profile information, commercial purchase activity, media viewing activity, and related trackable user activity.

As will be explained in reference to the following examples, location tracking features for a customer's mobile device may be implemented in connection with beacons or like identification stations. In one example, the location identification may be provided in connection with Bluetooth or Near Field Communications (NFC) identification beacons or tags. In another example, the location identification may be provided in connection with the use of Wi-Fi (Wireless Fidelity) positioning services and similar indoor positioning techniques (provided by systems referred to as indoor geolocation or "indoor GPS" positioning systems). The techniques described herein utilize location-aware consumer devices such as smartphones and techniques such as wireless network tracking to compile location information that may be used in connection with subsequent media content delivery. These location techniques may be enhanced through retailer-specific information on store layouts, product types and brands, mapping information, and customer profile information that are exclusive to the retailer and the retailer's knowledge of the consumer user. This customer and location information may be correlated to media content delivery information and the selection and control of particular media content including but not limited to customized advertisements, audiovisual content, software content, and like information offerings.

FIG. 1 provides a system illustration 100 of tracked electronic interactions with a customer 130 operating a mobile computing device 132 within a real-world retail environment according to one example. FIG. 1 in particular shows user activities occurring within a retail environment such as a particular retail store 111 of a retailer 104. As shown the retailer 104 may operate a plurality of retail stores 110 and conduct various sales and service activities within the particular retail store 111. Although the following example is provided with reference to the particular retail store 111, it will be understood that the techniques described herein may collect and deploy data on an enterprise-, region-, or a multiple-store basis, or focus activities to individual stores (and sections within individual stores).

As shown, the particular retail store 111 is connected to a headquarters of the retailer 104 via a private network connection 105A, and the plurality of retail stores 110 are likewise connected to the headquarters of the retailer 104 through at least one private network connection 105B. Customer tracking data is maintained for the plurality of retail stores 110 and the particular retail store 111 for processing by servers 106 and storage by a data warehouse 108.

In the particular retail store 111, a customer 130 operates a mobile computing device 132 within a plurality of store departments and sections. (The customer 130 may be in active or passive operation of the mobile computing device 132, for example, with the use of software that operates on-demand, automatically, or as a background application on the mobile computing device 132.)

Within the particular retail store 111, the customer 130 may be involved in various types of commercial activities, such as shopping activities, promotional activities, and service activities. These commercial activities in the retail store 111 may be tracked and monitored in connection with the data collected by the headquarters of the retailer 104. As an example, at a first location 112 (a product sales area in a video department of the particular retail store 111), the customer 130 may spend time browsing store shelves for a particular title or genre; this activity is tracked in connection with the detection of beacon 124A located in (or adjacent to) the product sales area. As another example, at a second location 114, the customer may interact with a product in a demonstration area; this activity is tracked in connection with the detection of beacon 124B located in (or adjacent to) the demonstration area. As another example, at a third location 116, the customer may view another product in a second demonstration area; this activity is tracked in connection with the detection of beacon 124C located in (or adjacent to) the second demonstration area. As another example, at a fourth location 118, the customer may view a vendor display, or interact with specific employees or persons at the vendor display; this activity is tracked in connection with the detection of beacon 124D located in (or adjacent to) the vendor display area. As another example, at a fifth location 120, the customer may conduct a purchase activity; this activity is tracked in connection with the detection of beacon 124E located in (or adjacent to) the purchase activity area (e.g., at the store checkout or point-of-sale system).

In some examples, the data may also be collected in connection with operation of one or more of the illustrated beacons (e.g., beacons 124A, 124B, 124C, 124D, 124E) and, optionally, radio frequency tags or other detectable markers or identifiers that can be detected at particular locations in the retail environment (e.g., to be detected when the customer 130 is in proximity to a store display when browsing the video product sales area at the first location 112). In other examples, the positioning of the customer 130 at the various locations 112, 114, 116, 118, 120 is determined in connection with indoor positioning (e.g., triangulation or trilateration) performed with the use of a plurality of Wi-Fi access points 122A, 122B, 122C; this activity may be tracked in connection with the entry or movement of the customer into or within the various locations 112, 114, 116, 118, 120 or surrounding location areas, which may be determined in connection with geofences, perimeters, and like defined areas.

The information from the customer activity in the particular retail store 111 may be transmitted to the retailer 104 in connection with a private network connection 105B. In another example, the information from the customer activity in the particular retail store 111 is transmitted to the retailer 104 in connection with a publicly facing interface (e.g., an application programming interface (API)) that is accessible by the customer mobile computing device 132.

The information from the customer activity in the particular retail store 111 and the other retail stores 110 is accessed by a content network 102 in connection with a network connection 105C to the retailer 104. The content network 102 may access the data processed by the servers 106 and stored in the data warehouse 108 directly or through an interface via the retailer 104. The information from the customer activity may be indicated by data representing: product areas visited by the customer 130, duration of visits by the customer 130 to the respective product areas, product brands evaluated by the customer 130 in the respective product areas, purchase activity conducted by the customer 130, and the like.

The various tracking activities in the particular retail store 111 may be facilitated through a variety of wireless communication devices and protocols. For example, the tracking activities may be facilitated by operations of one or more consumer computing devices (such as a smartphone, tablet, portable computer, or wearable device) that execute software to interact with the tracking ecosystem. The tracking activities may be provided in connection with a software application operating on the consumer computing device, execution of a software application as a background process on the consumer computing device, or functionality built into the operating system of the consumer computing device. In other examples, a dedicated device may be provided to or stationed near the customer 130. For example, each trackable customer in the retail environment may operate a computing device at or adjacent to his or her respective location, that directly or indirectly provides the location of the computing device (and the customer) relative to an access point, beacon, radio frequency identifier, or the like. Example tracking implementations using Bluetooth, Wi-Fi, and RFID/NFC technologies are further discussed below.

Bluetooth.

The term "Bluetooth" as used herein refers to a short-range digital communication protocol, which may provide a short-haul wireless protocol frequency-hopping spread-spectrum (FHSS) communication technique that operates in the 2.4 GHz spectrum. The Bluetooth protocol may operate according to a standard established by the Bluetooth Special Interest Group (SIG). A standard Bluetooth exchange permits devices typically within 30 feet of a transponder to receive and/or send data (with a maximum possible range for non-experimental deployments being less than 50 m). However, a requesting device typically must opt-in to receive services from the transponder—a process known as "pairing".

One specific implementation of Bluetooth for proximity detection and tracking involves the use of Bluetooth beacons, for example the implementation of Bluetooth beacons known as "iBeacons". iBeacons operate using the Bluetooth Low Energy protocol (e.g., as defined in the Bluetooth 4.0 specification), through the use of a low-power wireless sensor beacon used to communicate information to a nearby wireless device. A wireless device may detect such beacons in some configurations for up to a 200 foot range. Wireless devices may be configured to set up and establish a connection with particular beacons without needing to perform a full Bluetooth pairing process.

Proximity detection in a retail environment may utilize Bluetooth for tracking portable computing devices such as mobile smartphones supporting Bluetooth communications. For example, a software application may opt in to communicate with a particular set of Bluetooth beacons in a retail environment. In other examples, the operating system of the portable computing device may opt in to particular advertising networks or beacon groups. The communications with these Bluetooth beacons may be used to determine proximity to a particular location. In further examples, triangulation or trilateration of device locations may be performed with the use of additional antennas and beacon sources.

Wi-Fi.

Wi-Fi refers to the standard operation of a protocol from the IEEE 802.11 family of wireless network protocol standards, implemented within standards such as IEEE 802.11a/b/g/n/ac/ax. Many Wi-Fi implementations utilize service discovery techniques to discover access points in range. For example, the wireless device may periodically probe nearby wireless networks with probe request frames. From these probe request frames, the device's identifying MAC address is broadcast to listening access points and other devices in range. In addition, a device's MAC address may be broadcast to listening access points even if connected to another access point, because frame headers that accompany encrypted or unencrypted data payloads can identify the device's MAC address. In other scenarios, device identifiers may be determined in connection with triangulation of messages that are transmitted from a client device during Wi-Fi access point scanning procedures, DHCP connection establishment, and the extraction of data headers being exchanged with other Wi-Fi access points and networks.

Device-identifying data may be collected by routers and networking equipment regardless of whether the client device has requested to directly join or search for the Wi-Fi network. Such identifying data may be collected by a tracking system and triangulated to identify the physical location of the client based on the timestamp delays and offsets collected by multiple routers, and time of flight calculations based on the collected data. Other techniques such as signal strength, directional antennas, and response times may also be used in connection with Wi-Fi triangulation or trilateration techniques. In addition, identifying data obtained from other messages used in established Wi-Fi connections and broadcasts may be utilized for tracking purposes. In some examples, the device-identifying data is provided only on an opt-in basis; in other examples, opt-out functionality is provided with a mechanism to prevent transmission or collection of device-identifying data.

Near Field Communication (NFC) and Radio Frequency Identification (RFID).

NFC refers to protocols and data exchange standards involving the use of RFID communication chips. NFC may be used for two-way communication between endpoints to exchange data. In contrast, other uses of RFID chips may be one-way communications (e.g., to obtain an identifier from a RFID tag mounted at a particular location that must be processed further).

Proximity detection in a retail store may be performed using a combination of NFC exchanges associated with a communication device in proximity to a particular identifiable location. Proximity detection may also be performed through detection of RFID tags associated with a particular identifiable location in the retail environment. NFC and RFID technologies may also be used to provide a more precise mechanism of location once a device's location has been triangulated to a particular area or subset of a store with Wi-Fi or Bluetooth wireless communications.

Figure 2:
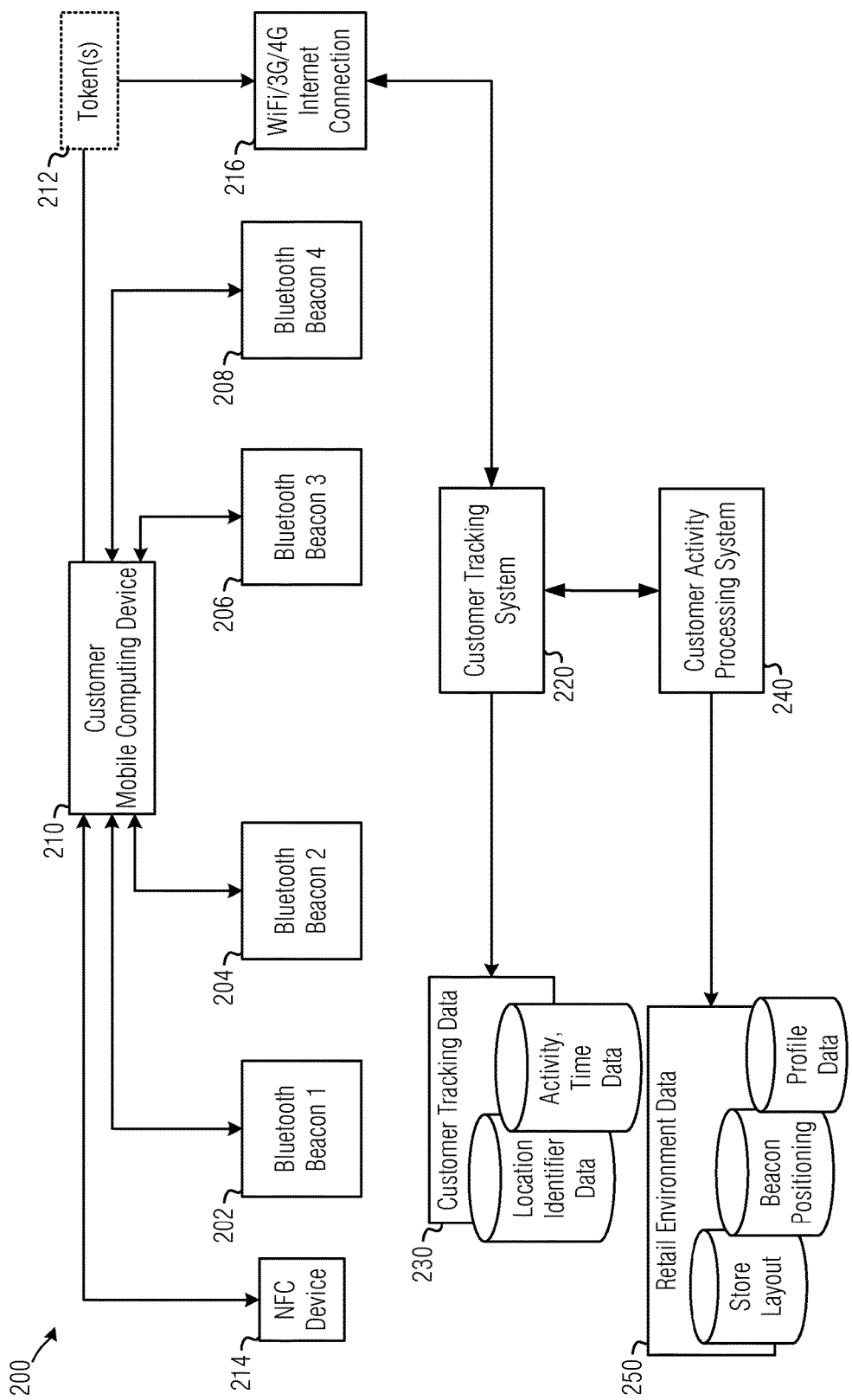
FIG. 2 illustrates communication activities occurring among systems and devices based on customer activity in a real-world retail environment according to an example described herein.

FIG. 2 provides an enhanced illustration of communication activities 200 occurring among a customer mobile computing device and a customer tracking system, based on customer activity in a real-world retail environment according to a further example. For the communication activities 200, various communication networks (e.g., wireless data networks) exchange data to interact with customer devices such as a customer mobile computing device 210, to result in the collection of data by a customer tracking system 220 and a customer activity processing system 240. Again, the customer mobile computing device 210 may include a smartphone, dedicated device, wearable device, or other electronic device or medium that can be used to uniquely identify and track a location of a particular person and his or her activity within a tracked environment (e.g., tracking the customer shopping activity within the retail location).

As shown, a customer mobile computing device 210, operated by a customer, is configured to exchange wireless communications with one or more beacons (e.g., Bluetooth beacon 1 202, Bluetooth beacon 2 204, Bluetooth beacon 3 206, and Bluetooth beacon 4 208) located throughout the tracked environment. In addition to communications with the one or more beacons, the customer mobile computing device 210 may interact with other location identification devices such as an NFC device 214 (e.g., an active RFID device) or an RFID tag (e.g., a passive RFID device). The beacons 202, 204, 206, 208 are able to communicate with a plurality of mobile devices to identify locations of the respective devices.

The data collection functions for tracking the visited location(s) of the client device may be performed by the respective beacons (e.g., with a data connection between the various beacons and the customer tracking system). The data collection functions may also be performed as a result of information provided to a customer tracking system 220 via an internet connection 216 with the customer mobile computing device 210, such as a Wi-Fi WLAN or 3G/4G WWAN internet connection. For example, the customer mobile computing device 210 may retrieve a unique identifier (e.g., a value represented in a token 212) from a respective beacon, and pass this token 212 to the customer tracking system 220 via the internet connection 216.

The identification of the value in a token 212 or another unique identifier from a Bluetooth beacon may be used to determine a location of the customer mobile computing device 210 within the retail environment. For example, the customer tracking system 220 may store customer tracking data 230 that includes data for the various location identifiers (e.g., tokens), in relationship to activity or time data. The customer tracking data 230 may be used to provide raw, filtered, or processed data indicating activity by the customer at a particular time and location, based on a location identifier, device identifier, activity or time data, or similar information.

The identification of a location value in a token 212 or another unique identifier from the Bluetooth beacon also may be used to correlate user activity with specific activity types or categories in a retail environment. For example, this correlation may be used to determine activity by the customer associated with the customer mobile computing device 210 within the retail environment relative to some fixed location, grid, or map of the retail environment. For example, the customer activity processing system 240 may factor store layout data, beacon positioning, and customer profile data when analyzing the specific customer activity within the tracked environment. Additional factors and data inputs for customer location tracking and activity processing may be considered in connection with operations of the customer tracking system 220 and customer activity processing system 240.

Figure 3:
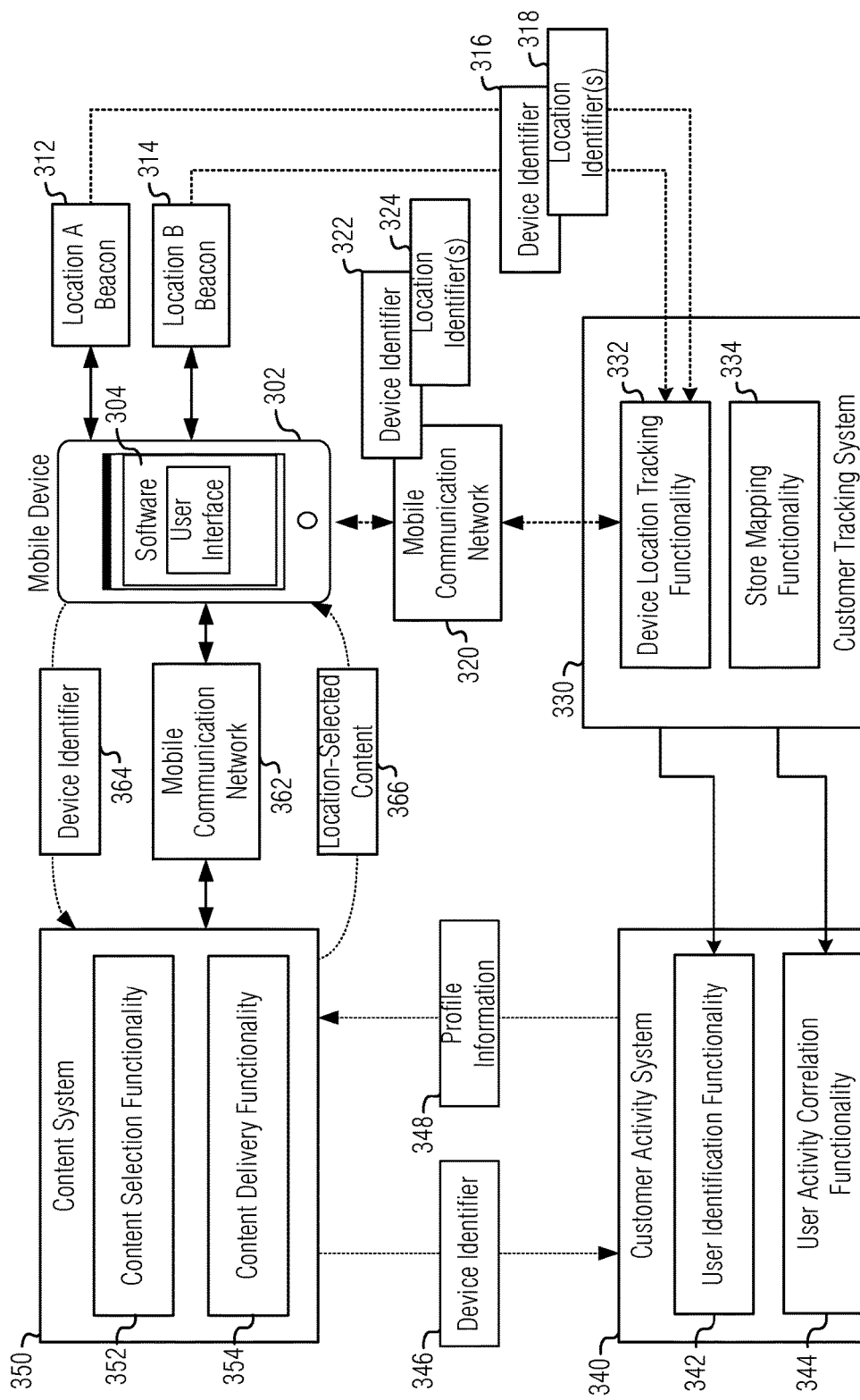
FIG. 3 illustrates interactions of a mobile device with customer tracking and content delivery systems to access content in a beacon-based media network according to an example described herein.

FIG. 3 illustrates interactions of a mobile computing device 302 with customer tracking and content delivery systems to access content in a beacon-based media network according to an example. As shown, the mobile computing device 302 operates a software application 304 presenting a user interface. This software (e.g., an app provided by a retailer) operates to interact with various beacons in a tracked environment, such as Location A beacon 312 and Location B beacon 314 positioned within a monitored retail environment. The separate interactions with the beacon at Location A and the beacon at location B serves to differentiate user interaction and activity between the two locations of the tracked environment.

As a result of the interaction between the mobile computing device 302 and the Location A beacon 312 and the Location B beacon 314, tracking data is transferred to a customer tracking system 330. For example, the tracking data may include a unique device identifier (e.g., an identifier unique to the mobile computing device 302) and a location identifier (e.g., an identifier unique to the specific visited beacon such as Location A beacon 312). As shown, a device identifier 316 and location identifier 318 may be communicated to the customer tracking system 330 by the respective beacons 312, 314 as a result of interaction with the mobile computing device 302 detected by the beacon(s); a similar form of the device identifier 322 and location identifier 324 may be communicated to the customer tracking system 330 from the mobile computing device 302 via a mobile communication network 320 (e.g., a Wi-Fi or 3G/4G data network).

The customer tracking system 330 operates to perform device location tracking functionality 332 as a result of processing the device identifier 316 or 322 and location identifiers 318 or 324. The customer tracking system 330 operates to correlate the device location with store mapping functionality 334, for example, to correlate a specific location of the mobile device with a particular section, zone, area, display, product, service, brand, or feature of the retail environment. The store mapping functionality may use elements of a store map, planogram, coordinate listing, or other layout or plan to correlate an identified device location to some known feature of the retail environment.

In a similar fashion, the customer activity system 340 operates to provide user identification functionality 342 and user activity correlation functionality 344. The user identification functionality 342 operates to identity a specific user/customer or profile of the user/customer based on a device identifier 346, such as may be retrieved on request from a content system 350. The user activity correlation functionality 344 operates to correlate a specific set of activities in the tracked environment with a specific user/customer as identified by a device identifier 346. The customer activity system 340 may further operate to provide the customer activity directly to the content system 350, or provide the information in the form of profile information 348 that allows a representation of the customer (such as interest or activity relative to certain brands, products, activities) with or without raw activity or tracking data.

FIG. 3 further illustrates the data operations to access customized information from the content system 350 (e.g., a media network such as is designed for serving advertisements or other media content) as a result of the previous user activity in the tracked environment. For example, the software application 304 may provide a device identifier 364 to the content system 350 as part of a request for location- and user activity-customized advertisements.

The content system 350 includes content selection functionality 352 that operates to determine the most appropriate content based on prior user activity tracked with the mobile computing device. The content selection functionality 352 operates to select information based on the device identifier 364, according to correlation with customer activity in the tracked environment and related profile information 348. For example, the content system 350 may select information from the customer activity system 340 based on the device identifier 346 which is associated with particular customer activities, events, and profile information. (The customer activity system 340 may directly return customer activity information data, or processed information such as the profile information 348).

The content system 350 further includes content delivery functionality 354 that operates to deliver the location-selected content 366 to the mobile computing device 302 via a mobile communication network 362. The location-selected content 366 may be directly displayed within the user interface of the software application 304 or may be further customized, refined, or processed within the software application 304, or within features of the mobile computing device 302 operating system.

Figure 4A:
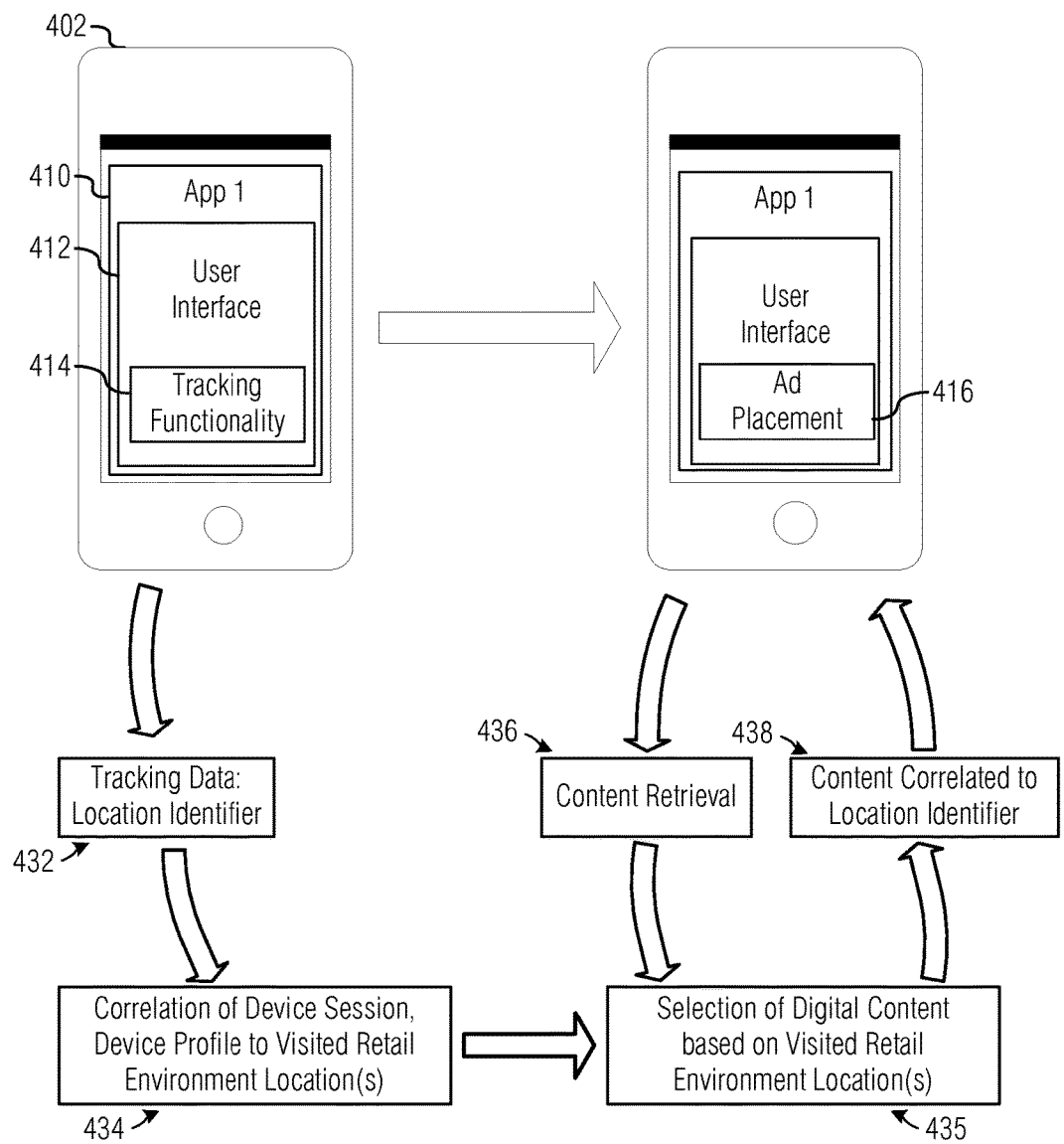
FIG. 4A illustrates an example scenario of accessing location activity-customized content in a beacon-based media network using a mobile software application, according to an example described herein.

FIG. 4A illustrates an example scenario of accessing location activity-customized content in a beacon-based media network using a software application 410 operating on a mobile computing device 402, according to an example. The software application 410 operates on the mobile computing device 402 with a user interface 412 for user interaction and control of the software application 410, as may be embodied by a software application of a retailer, for example. The software application 410 also includes tracking functionality 414 to indicate the location of the mobile device, such as within a retail environment. The tracking functionality 414 for example can interact with beacons, tags, access points, and like tracking devices to interact with tracking sources. The data from the tracking devices may be collected as tracking data 432, and include at least one tracking identifier or data field. Next, operations are performed in a remote tracking system to perform a correlation 434 of a device session and device profile to visited tracked environment locations (e.g., locations within a store), based on the detected location of the mobile device within the tracked environment.

As a result of the correlation 434, a selection of digital content 435 is determined based on the activity in the visited tracked environment location(s). This selection of digital content 435 is initiated as a result of content retrieval 436 from the application 410, for example, from a request to obtain an advertisement placement 416 within the application 410. The selection of digital content 435 provides content correlated to the location identifier 438 and other tracking and profile data indicators, resulting in a delivery to the application 410.

Figure 4B:
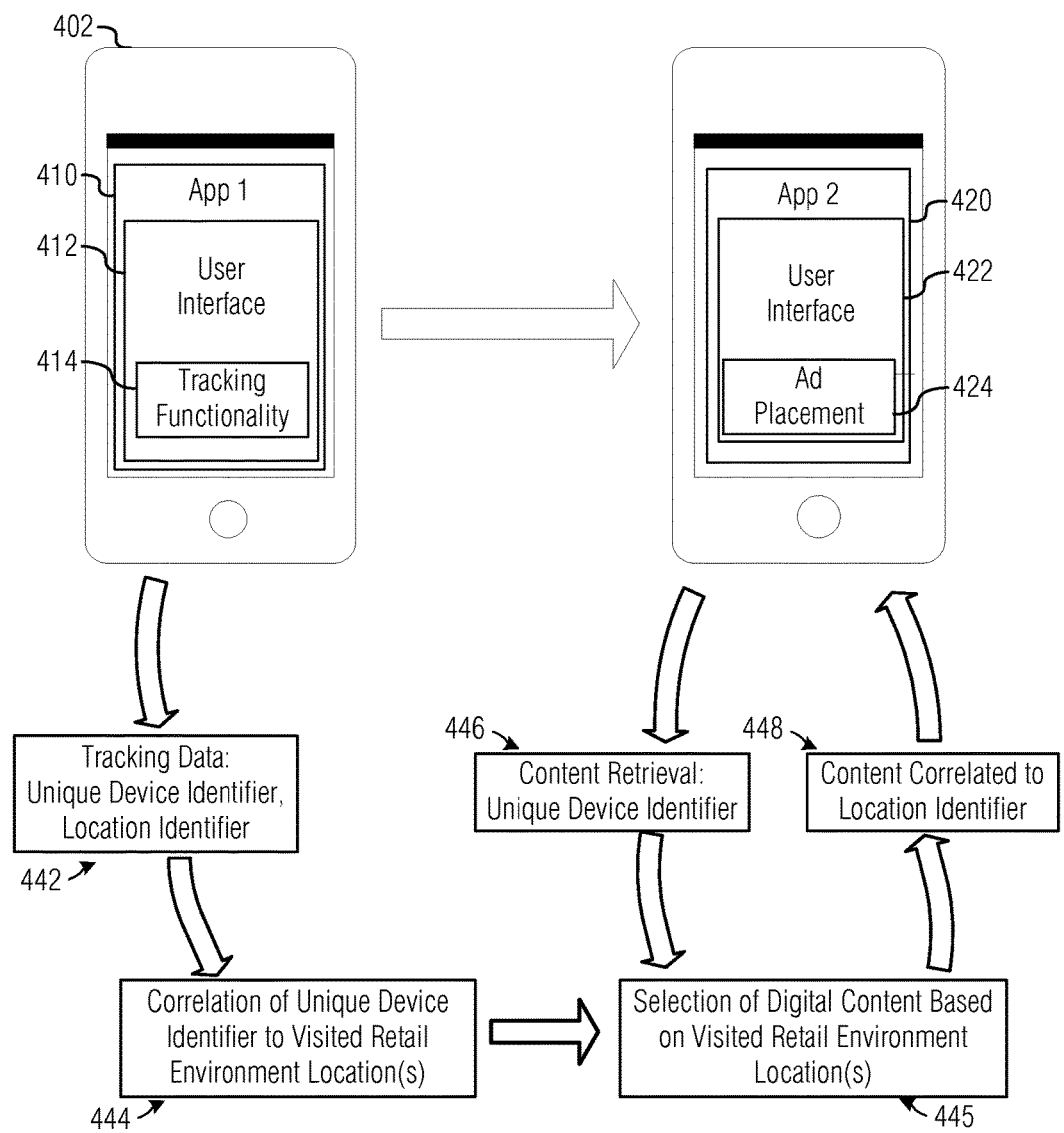
FIG. 4B illustrates an example scenario of accessing location activity-customized content in a beacon-based media network using multiple mobile software applications, according to an example described herein.

FIG. 4B illustrates an example scenario of accessing location-customized content in a beacon-based media network using multiple software applications, a first software application 410 (e.g., relating to retailer shopping functionality) and a second software application 420 (e.g., relating to sports, weather, entertainment functionality), each operating on a mobile computing device 402, according to an example. The first software application 410 operates to provide tracking data to a tracking system, while the second software application 420 operates to access media content that is selected based on the tracking data.

As shown, the first software application 410 operates on the mobile computing device 402 and includes a user interface 412 for user interaction and control of the first software application, as may be embodied by a software application of a retailer, for example. The first software application 410 also includes tracking functionality 414 to indicate the location of the mobile device, for example, within a retail environment. In an example, tracking data 442 in the form of a unique device identifier and a location identifier (e.g., a beacon identifier) is provided to a remote tracking system from the tracking functionality 414. In an example, the tracking data includes a unique identification token issued for the device, the location, the user, or a combination of the device, location, and user.

Within the remote tracking system, the tracking data 442 (such as the unique device identifier or the token) is analyzed to perform a correlation 444 of the particular mobile computing device to one or more visited retail environment locations. This correlation 444 is used to facilitate a selection of digital content 445 based on the one or more visited retail environment locations. The selection of digital content 445 may include information on the type of content, metadata for the content, or the content itself. A set of content 448 delivered for the mobile computing device is correlated to the one or more visited retail environment locations, for example, on the basis of a location identifier.

The set of content 448 delivered for the mobile computing device is retrieved for display or output within the second software application 420, for example, as an advertising placement 424 within a user interface 422 of the second software application 420. This advertising placement 424 may be interactive, and manually or automatically launched in response to user activity in the second software application 420. In some examples, other fields of tracking and location information (e.g., collected and retrieved from the first software application 410) may be locally stored on the mobile computing device 402 and used for further customization or refinement of the content displayed within the second software application 420. Also in some examples, the fields of tracking and location information are correlated to advertising network uses for mobile advertising platforms such as Apple's iAd, Google's AdMob or AdSense, or like targeted media platforms.

Figure 5:
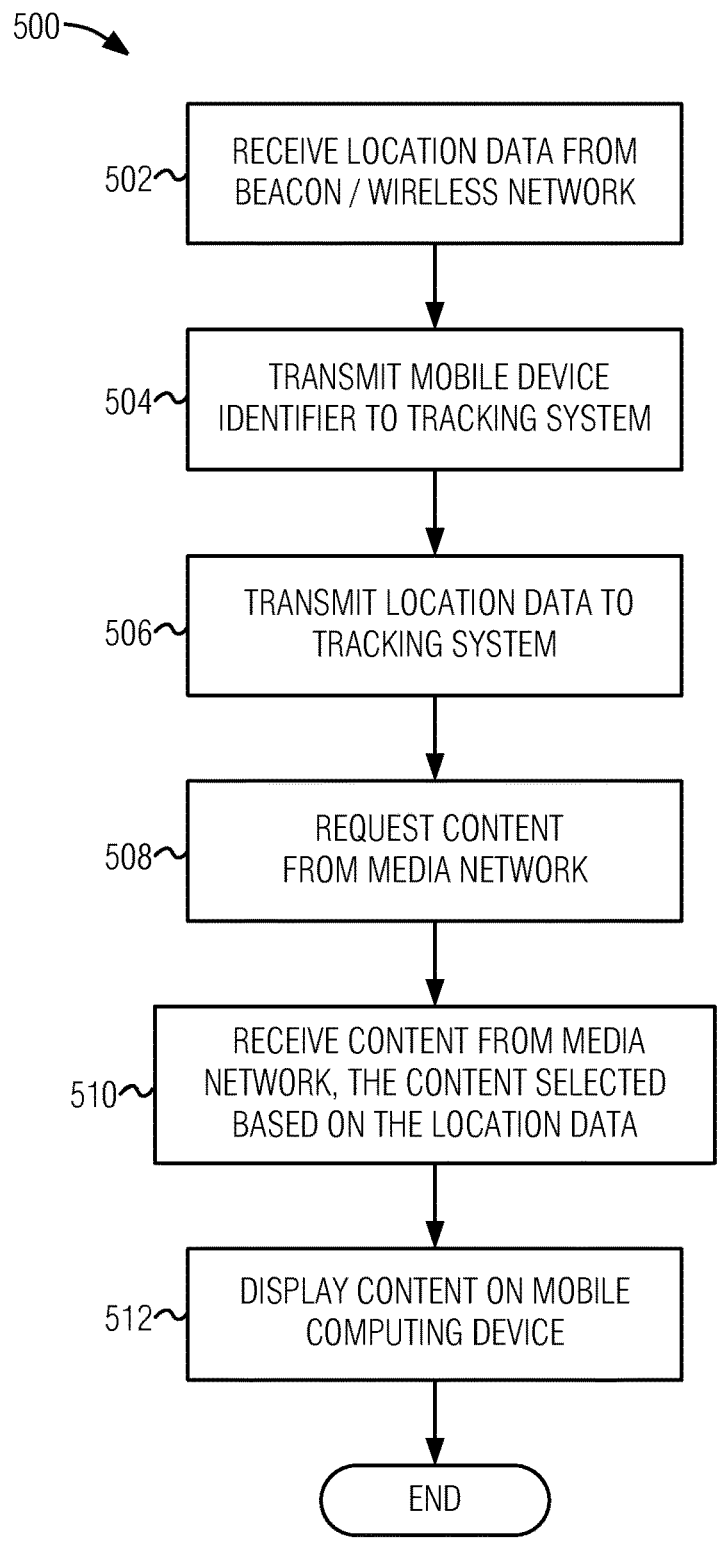
FIG. 5 illustrates an example method performed by a mobile computing device for content retrieval in a beacon-based media network, according to an example described herein.

FIG. 5 illustrates an example method 500 performed by a mobile computing device for content retrieval in a beacon-based media network according to an example described herein. The method 500 may be implemented in hardware or software within one or more electronic systems; and in some examples, the operations of method 500 may be split across multiple entities. For example, the method 500 may be embodied by a non-transitory machine-readable medium including instructions, or one or more data processing, communication, and display components implemented in connection with a hardware processor and a memory. Accordingly, it will be understood that the method 500 may be implemented with a computerized or electronic process that involves minimal or no human interaction.

As illustrated, the method 500 for content retrieval includes operations to obtain (e.g., retrieve, access, or identify) location data from a beacon, RFID tag, wireless network, or other electronically readable or communicable source (operation 502). This location data may be processed by the mobile computing device and used in connection with device-specific and application-specific activity, including information as indicated by user preferences, user profiles, and device-specific information. The mobile computing device (or in other examples, the beacon) operates to transmit an identifier of the mobile computing device (operation 504) and transmit the location data (operation 506) to a tracking system.

The method 500 further operates to request content from the beacon-based media network (operation 508) on the basis of the mobile computing device identifier and the location data. In response to the request for content, the mobile computing device receives content from the beacon-based media network (operation 510), the content being selected based on the communicated location data (and, in some examples, also based on the mobile device identifier or known information about the device or user).

In response to receiving the content from the beacon-based media network, further processing may be performed on the content. For example, the received content may be further selected, processed, and refined, such as in response to user preferences, an advertising profile, or settings on the mobile device. Further, in response to receiving the content, the received content is displayed on the mobile computing device (operation 512). The received content may be displayed within a portion of a software application, within a user interface of the operating system, within a media player, or within like display interfaces.

Figure 6:
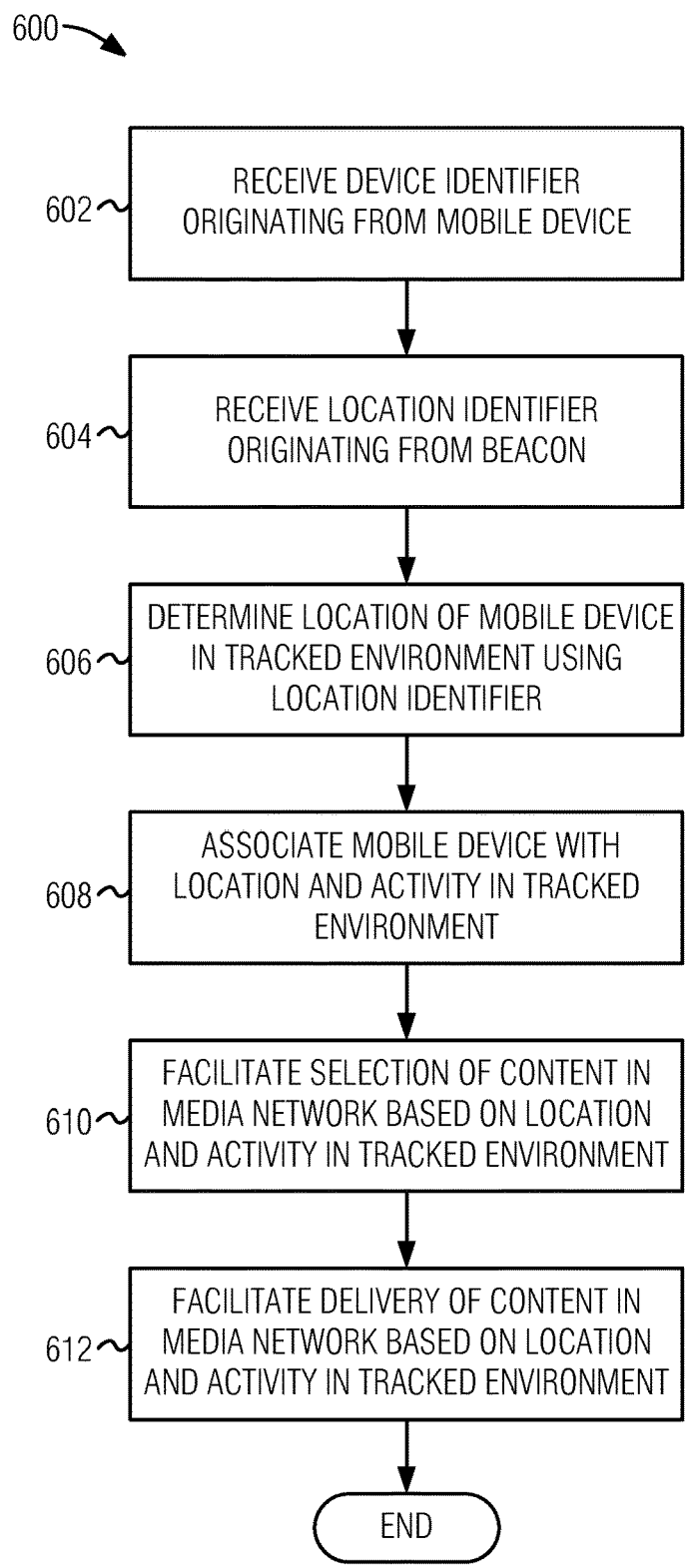
FIG. 6 illustrates an example method performed by tracking and content selection subsystems for content delivery in a beacon-based media network, according to an example described herein.

FIG. 6 illustrates an example method 600 performed by tracking and content selection subsystems for content delivery in a beacon-based media network according to a further example. The method 600 may be implemented in hardware or software within one or more electronic systems (and as steps in substitute or addition to those of FIG. 5); and in some examples the operations of method 600 may be split across multiple entities. The method 600 may be embodied by a non-transitory machine-readable medium including instructions, or one or more data processing, communication, tracking, and delivery components implemented in connection with a hardware processor and a memory. Accordingly, it will be understood that the method 600 may be implemented with a computerized or electronic process that involves minimal or no human interaction.

As illustrated, the method 600 for content delivery includes operation to receive, process, and facilitate delivery of information to a mobile device. As shown, information originates from a mobile device and a beacon, in the form of operations to receive a device identifier from a mobile device (operation 602) and to receive a location identifier originating from a beacon (operation 604). For example, the beacon identifier may be recorded by a mobile device and communicated to a tracking system.

The method 600 further operates to determine a location of the mobile device in a tracked environment (e.g., a retail store) using the location identifier that originates from the beacon (operation 606). This location of the mobile device in the tracked environment is associated with identified activity of the particular customer or device in one or more particular locations of the tracked environment (operation 608). For example, the association between the mobile device location and the activity in the tracked environment may occur based on known characteristics of the beacon and the type of activity expected to occur there.

The information system can further operate to facilitate the selection of content based on the known location and activity of the mobile computing device in the tracked environment (operation 610). Based on this selection of content, the information system can further operate to facilitate the delivery of the selected content to the mobile computing device (operation 612) (in the same or another mobile application, or in another format) such as through the display of an advertisement in a software application.

Figure 7:
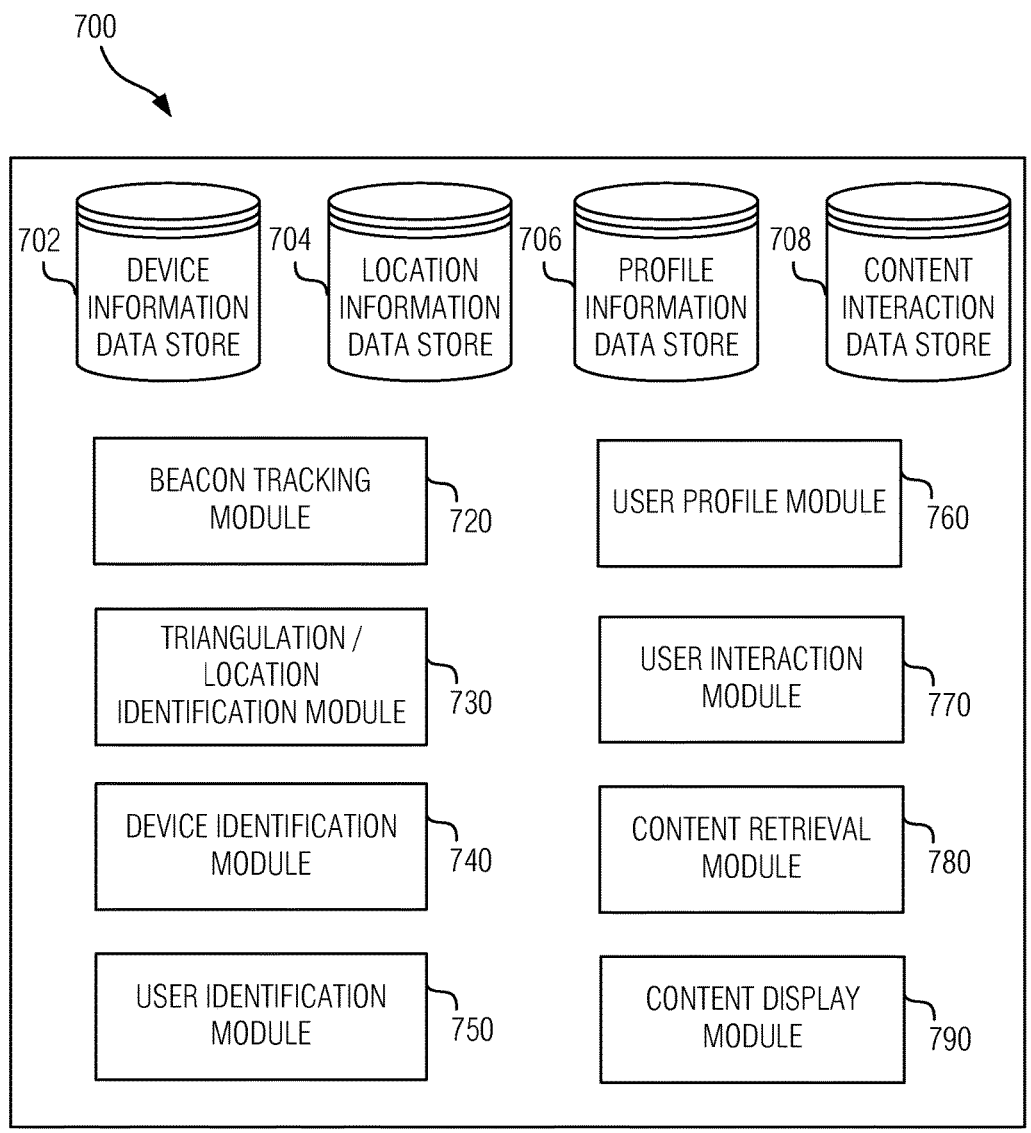
FIG. 7 illustrates a block diagram of computing system components adapted for interaction with a beacon-based media network, according to an example described herein.

FIG. 7 illustrates a block diagram of a computing system 700 with processing components adapted for interaction with a beacon-based media network according to a further example. The computing system 700 may include a processor, memory, operating system, and user input interface to operate and provide interaction with the beacon-based media network and associated devices, systems, and implementations. The computing system 700 may be implemented within one or a plurality of computer system devices, at one or multiple locations, and be implemented in connection with features of remote or cloud-based processing functions.

The computing system 700 is configured to implement a plurality of modules or components for device tracking, content retrieval, and content display according to the functionality described above. The computing system 700 is also configured to implement and maintain a plurality of data stores for storing data used to provide the tracking functionality described above. A description of the following modules and data sources follows, but it will be understood that functionality and operation of the various data sources and modules may be consolidated into fewer or expanded into additional data sources or modules.

The computing system 700 is depicted as including: a device information data store 702 for storing or maintaining device information such as a unique identifier of the computing system; a location information data store 704 for storing or maintaining location information such as an identifier of a detected beacon, or location data received from one or more Wi-Fi access points; an profile information data store 706 for storing user identification information and user profile information; and a content interaction data store 708 for storing or maintaining content information such as received media content, content preferences, or content data on the mobile computing device. Additional data stores may also be used to track, persist, maintain, and track data involved in the tracking and media output functions described herein.

The computing system 700 is also depicted as including a series of modules or components providing functionality for implementing the features of a client system for interaction with a tracking system. The modules or components depicted include: a beacon tracking module 720 used for detecting and communicating with beacon devices such as Bluetooth Low Energy or NFC beacon devices; a triangulation/location identification module 730 used for calculating a position of the mobile computing device in the tracked physical environment, such as relative to a plurality of Wi-Fi access points; a device identification module 740 used for providing an identifier unique to the mobile computing device to the device tracking system; a user identification module 750 used for providing identifying information to the device tracking system that is unique to a user of the mobile computing device; a user profile module 760 used for providing information to the device tracking system that is unique to a user profile of the user; a user interaction module 770 used for tracking customer or device interactions with shopping or commercial activities in the retail environment; a content retrieval module 780 used for retrieving content from the media network that is targeted to the customer; and a content display module 790 used to display the media content.

Although the preceding examples were provided with reference to the use of Wi-Fi and Bluetooth technology, it will be understood that a variety of other location, tracking, and positioning systems may also be used to facilitate customer tracking, content selection, and content delivery. For example, other types of device positioning tracking technologies may be used to track particular devices and persons. Further, the tracking technologies as deployed in a retail environment may be integrated with various retail informatics and analytics services to provide an additional customization of content to the mobile device users. Further, it will be understood that the techniques and components described herein may be applied to a variety of consumer mobile devices, and are not limited to smartphones with Wi-Fi and Bluetooth capabilities.

Figure 8:
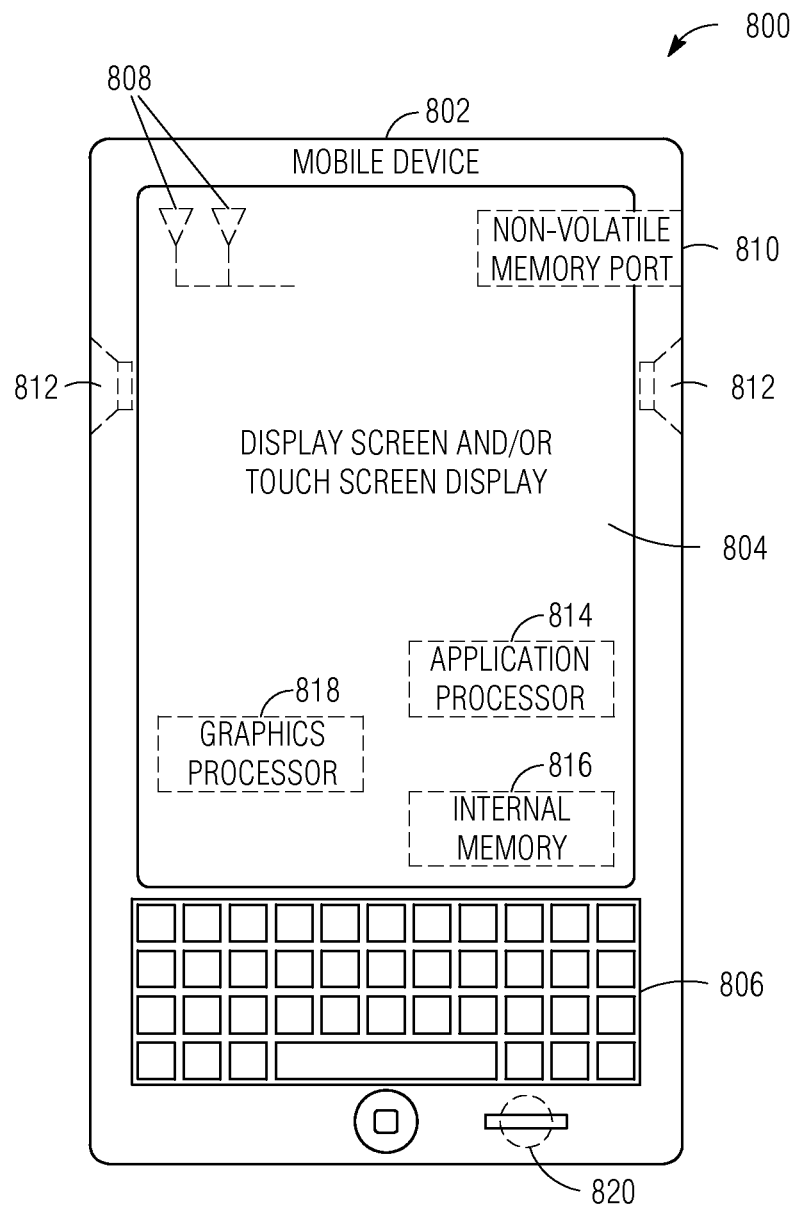
FIG. 8 illustrates an example mobile computing device on which the configurations and techniques described herein may be deployed.

FIG. 8 provides an example illustration of a mobile device 800 that may be used in connection with the tracking and information output techniques described herein, such as a personal communication device, a tablet, a handset, a smartphone, or other type of mobile wireless-capable device. The mobile device 800 may include one or more antennas 808 within housing 802 that are configured to communicate with a base station (BS), a Long Term Evolution (LTE) evolved NodeB (eNodeB), or other type of wireless wide area network (WWAN) access point. The mobile device 800 may be configured to communicate using at least one wireless communication standard including 3GPP LTE/LTE-Advanced, WiMAX, High Speed Packet Access (HSPA), Bluetooth, or Wi-Fi. The mobile device 800 may communicate using separate antennas for each wireless communication standard or shared antennas for multiple wireless communication standards. The mobile device 800 may communicate in a wireless local area network (WLAN), a wireless personal area network (WPAN), or a WWAN.

FIG. 8 also provides an illustration of a microphone 820 and one or more speakers 812 that may be used for audio input and output from the mobile device 800. The display screen 804 may be a liquid crystal display (LCD) screen, or other type of display screen such as an organic light emitting diode (OLED) display. The display screen 804 may be configured as a touch screen. The touch screen may use capacitive, resistive, or another type of touch screen technology. An application processor 814 and a graphics processor 818 may be coupled to internal memory 816 to provide processing and display capabilities. A non-volatile memory port 810 may also be used to provide data input/output options to a user. The non-volatile memory port 810 may also be used to expand the memory capabilities of the mobile device 800. A keyboard 806 may be integrated with the mobile device 800 or wirelessly connected to the mobile device 800 to provide additional user input. A virtual keyboard may also be provided using the touch screen.

The display screen 804 may generate a graphical user interface on the mobile device in connection with the techniques described herein, for output of information such as advertisements, audiovisual content, promotional information, and the like. The mobile device 800 may operate with various types of user controls in order to interface and control the output of the information. Consistent with the tracking techniques described herein, the mobile device 800 may also include further functionality such as wireless network circuitry and processing software in order to communicate with specialized wireless network tracking devices and systems.

Embodiments used to facilitate and perform the techniques described herein may be implemented in one or a combination of hardware, firmware, and software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 9:
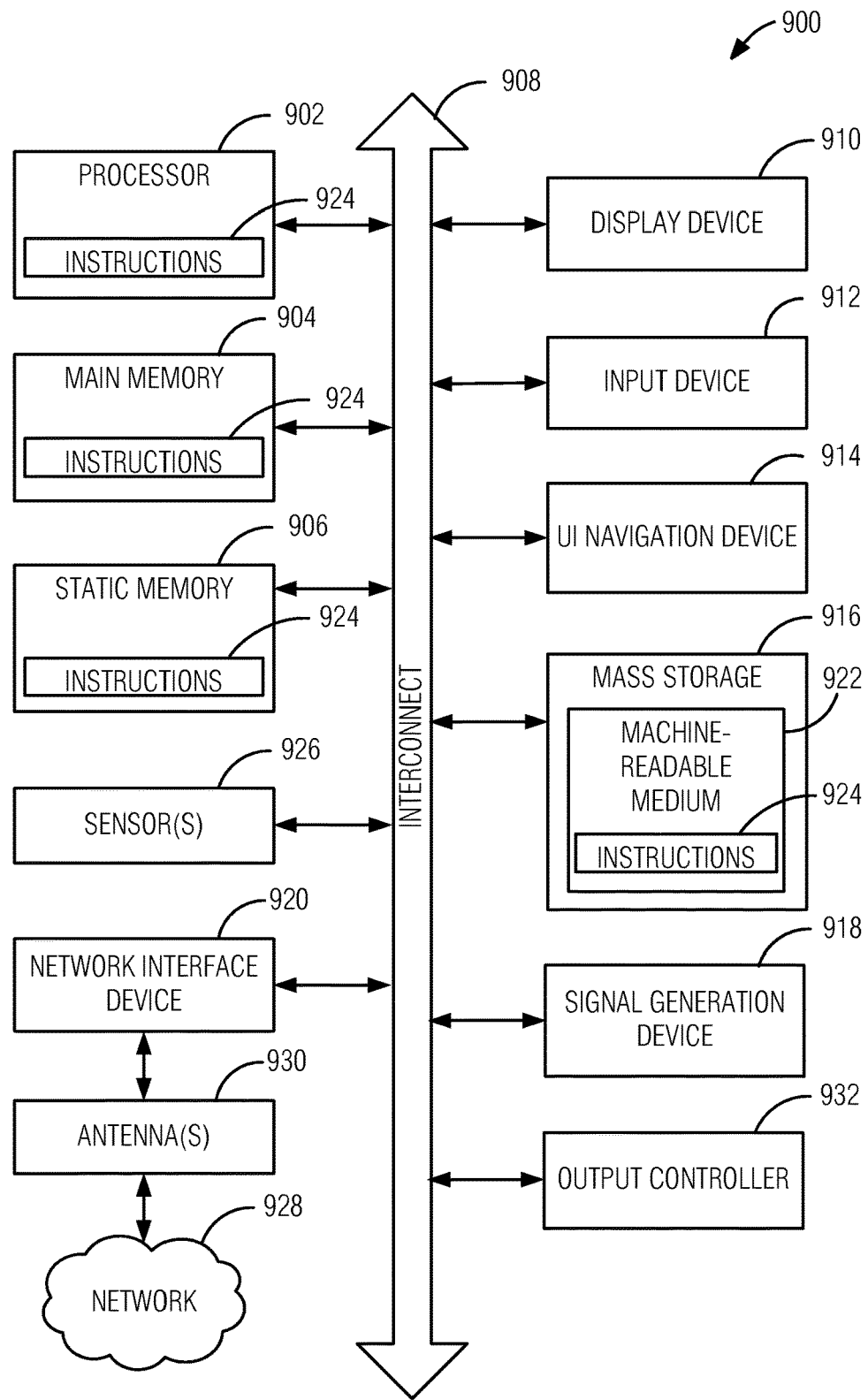
FIG. 9 is a block diagram illustrating operational components of a computing device upon which any one or more of the methodologies herein discussed may be run.

FIG. 9 illustrates a block diagram illustrating a machine in the example form of a computer system 900, within which a set or sequence of instructions may be executed to cause the machine to perform any one of the methodologies discussed herein, according to an example. Computer system machine 900 may be embodied by the electronic processing systems implemented by the servers 102, 106, and data warehouse 108; the devices 132, 210, 304, 402; the access points 122A, 122B, 122C; the beacons 124A, 124B, 124C, 124D, 124E, 202, 204, 206, 208; the content and tracking systems 220, 240, 330, 340, 350; the subsystem(s) implementing the data stores 702, 704, 706, 708; the subsystem(s) implementing the various modules or components 720, 730, 740, 750, 760, 770, 780, 790; or any other electronic processing or computing platform described or referred to herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via an interconnect 908 (e.g., a link, a bus, etc.). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touchscreen interface and touchscreen display. The computer system 900 may additionally include a storage device 916 (e.g., a drive unit), a signal generation device 918 (e.g., a speaker), an output controller 932, a network interface device 920 (which may include or operably communicate with one or more antennas 930, transceivers, or other wireless communications hardware), and one or more sensors 926, such as a global positioning system (GPS) sensor, compass, accelerometer, location sensor, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 928 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 includes subject matter (such as a method, means for performing acts, machine readable medium including instructions that when performed by a machine cause the machine to performs acts, or an apparatus to perform) comprising: providing, from a first software application to a device tracking system, an identifier unique to a mobile computing device, the device tracking system performing a tracking of location data for the mobile computing device obtained within a tracked physical environment; receiving, in a second software application from a media content network system, media content selected for the mobile computing device, the media content network system selecting the media content for the mobile computing device based on the identifier unique to the mobile computing device and the location data for the mobile computing device within the tracked physical environment; and displaying the media content selected for the mobile computing device in the second software application.

In Example 2, the subject matter of Example 1 may include, wherein the displaying of the media content in the second software application occurs at a subsequent time outside of the tracked physical environment.

In Example 3, the subject matter of any one of Examples 1 to 2 may include, transmitting, to the device tracking system, the location data for the mobile computing device obtained by the mobile computing device within the tracked physical environment.

In Example 4, the subject matter of any one of Examples 1 to 3 may include, retrieving a unique location identifier from a Bluetooth Low Energy beacon or an RFID tag; wherein the location data transmitted to the device tracking system includes the unique location identifier.

In Example 5, the subject matter of any one of Examples 1 to 4 may include, receiving network information from a plurality of Wi-Fi access points operating according to an IEEE 802.11 protocol; wherein the location data transmitted to the device tracking system includes the network information from the plurality of Wi-Fi access points, the network information used in triangulation of the mobile computing device in the tracked physical environment relative to the plurality of Wi-Fi access points.

In Example 6, the subject matter of any one of Examples 1 to 5 may include, wherein providing the identifier unique to the mobile computing device includes transmitting the identifier from the mobile computing device to a beacon connected to the device tracking system.

In Example 7, the subject matter of any one of Examples 1 to 6 may include, wherein the tracked physical environment is a retail store, wherein the location data is correlated by the device tracking system to at least one section of the retail store, and wherein the media content is selected for the mobile computing device based on a visit of the mobile computing device within the at least one section of the retail store.

In Example 8, the subject matter of any one of Examples 1 to 7 may include, wherein the media content is further selected for the mobile computing device based on a duration of the visit of the mobile computing device within the at least one section of the retail store.

In Example 9, the subject matter of any one of Examples 1 to 8 may include, wherein the media content is an advertisement, the advertisement further selected for the mobile computing device based on the visit of the mobile computing device within the at least one section of the retail store and at least one additional demographic factor stored for a user of the mobile computing device.

In Example 10, the subject matter of any one of Examples 1 to 9 may include, wherein the media content is an advertisement, and wherein displaying the media content is automatically performed during use of the second software application outside of the tracked physical environment.

Example 11 includes subject matter (implemented in a machine such as a device, apparatus, or system) configured to execute instructions with a mobile computing device that: detect, from operation of a first software application on the mobile computing device, a location identifier for a beacon, the location identifier provided as a unique identification of a mapped portion of a physical area; receive, from the content media network, content information that is selected for the mobile computing device based on the location identifier for the beacon; and provide, for display in a second software application on the mobile computing device, the content information retrieved from the content media network.

In Example 12, the subject matter of Example 11 may include, wherein the location identifier is provided to a tracking system, the instructions further causing the mobile computing device to: transmit, to the content media network, the location identifier for the beacon; and transmit, to the content media network, a unique device identifier, wherein the unique device identifier is associated by the content media network with the location identifier, and wherein the content information that is received from the content media network is further received based on the unique device identifier.

In Example 13, the subject matter of any one of Examples 11 to 12 may include, the instructions further causing the mobile computing device to: store the location identifier on the mobile computing device; and provide the location identifier to the second software application; wherein the second software application requests the content information from the content media network using the location identifier.

In Example 14, the subject matter of any one of Examples 11 to 13 may include, the instructions further causing the mobile computing device to: enable display of the media content in the second software application when the mobile computing device is outside of the mapped portion of the physical area.

In Example 15, the subject matter of any one of Examples 11 to 14 may include, the instructions further causing the mobile computing device to: receive, with operation of the first software application, the location identifier for the beacon from a Bluetooth Low Energy beacon or an NFC device, the beacon located within the mapped portion of the physical area; and transmit, with operation of the second software application, the location identifier for the beacon to the content media network, wherein the content information is received from the content media network in the second software application in response to transmitting the location identifier for the beacon.

In Example 16, the subject matter of any one of Examples 11 to 15 may include, the instructions further causing the mobile computing device to: receive network information from a plurality of Wi-Fi access points operating according to an IEEE 802.11 protocol; and transmit, to the content media network, the network information, wherein the network information is used in triangulation of the mobile computing device in the mapped portion of the physical area relative to the plurality of Wi-Fi access points.

In Example 17, the subject matter of any one of Examples 11 to 16 may include, wherein the physical area is a retail store, wherein the unique identification of a mapped portion of a physical area is correlated to a section of the retail store, and wherein the media content is selected for the mobile computing device based on a visit of the mobile computing device within the section of the retail store, and wherein the content information is further selected for the mobile computing device based on a duration of the visit of the mobile computing device within the section of the retail store.

Example 18 includes subject matter (such as a device, apparatus, or machine) comprising: a processor; a tracking module in operation with the processor, the tracking module operable with a first software application to provide data unique to a visit of the mobile computing device within a tracked physical environment to a device tracking system, wherein the device tracking system tracks location data for the mobile computing device obtained within a tracked physical environment; a content retrieval module in operation with the processor, the content retrieval module operable with a second software application to retrieve media content for the mobile computing device, the media content selected for the mobile computing device based on the identifier unique to the mobile computing device and the location data for the mobile computing device within the tracked physical environment; and a content display module in operation with the processor, the content display module operable with the second software application to display the media content within the second software application.

In Example 19, the subject matter of Example 18 may include, a device identification module in operation with the processor, the device identification module operable with the first software application to obtain an identifier unique to the mobile computing device and provide the identifier unique to the mobile computing device to the device tracking system.

In Example 20, the subject matter of any one of Examples 18 to 19 may include, a user identification module in operation with the processor, the user identification module to provide information to the device tracking system that is unique to a user of the mobile computing device.

In Example 21, the subject matter of any one of Examples 18 to 20 may include, a user profile module in operation with the processor, the user profile module to provide information to the device tracking system that is unique to a user profile associated with a user of the mobile computing device.

In Example 22, the subject matter of any one of Examples 18 to 21 may include, wherein the tracking module is further to receive an identifier from a Bluetooth Low Energy beacon and transmit the identifier from the Bluetooth Low Energy beacon to the device tracking system, the identifier from the Bluetooth Low Energy beacon included in the data unique to the visit of the mobile computing device within the tracked physical environment.

In Example 23, the subject matter of any one of Examples 18 to 22 may include, a location identification module, the location identification module to calculate a position of the mobile computing device in the tracked physical environment.

In Example 24, the subject matter of any one of Examples 18 to 23 may include, wherein the location identification module is further to determine a location of the mobile computing device within the tracked physical environment based on Wi-Fi positioning triangulation or trilateration of the mobile computing device.

In Example 24, the subject matter of any one of Examples 18 to 23 may include, wherein the location identification module is further to determine a location of the mobile computing device within the tracked physical environment based on Wi-Fi positioning triangulation or trilateration of the mobile computing device.

Example 25 includes subject matter (such as a method, means for performing acts, machine readable medium including instructions that when performed by a machine cause the machine to performs acts, or an apparatus to perform) for customer targeting in a media network, performed by an information service, comprising: receiving, from a mobile computing device located in a retail area, an identifier unique to the mobile computing device; determining a position of the mobile computing device within the retail area, based on one or more interactions of the mobile computing device with a broadcasting device located in the retail area; associating the identifier unique to the mobile computing device with the determined position of the mobile computing device in the retail area; and providing information to the media network based on the position of the mobile computing device in the retail area, the media network providing media content to the mobile computing device after the mobile computing device is no longer located in the retail area.

In Example 26, the subject matter of Examples 25 may include, wherein determining the position of the mobile computing device in a retail area includes processing the one or more interactions of the mobile computing device with the broadcasting device; wherein associating the identifier unique to the mobile computing device with the position of the mobile computing device in the retail area includes associating the identifier unique to the mobile computing device with an identifier provided from the broadcasting device.

In Example 27, the subject matter of any one of Examples 25 to 26 may include, wherein the broadcasting device is a Bluetooth Low Energy (BLE) beacon, the BLE beacon associated with a predetermined section of the retail area.

In Example 28, the subject matter of any one of Examples 25 to 27 may include, wherein the broadcasting device is a Wi-Fi access point operating according to an IEEE 802.11 standard, wherein determining the position of the mobile computing device in the retail area further includes triangulating the position of the mobile computing device based on multiple Wi-Fi access points in the retail area, the position of the mobile computing device included within an identifiable portion in the retail area.

In Example 29, the subject matter of any one of Examples 25 to 28 may include, requesting, from the mobile computing device, the identifier unique to the mobile computing device, wherein the identifier unique to the mobile computing device is received in response to the requesting.

In Example 30, the subject matter of any one of Examples 25 to 29 may include, selecting media content in the media network based on the position of the mobile computing device in the retail area.

In Example 31, the subject matter of any one of Examples 25 to 30 may include, identifying, from a unique identifier transmitted to the information service via the wireless communications network, a user associated with the mobile computing device.

In Example 32, the subject matter of any one of Examples 25 to 31 may include, tracking movement of the user associated with the mobile computing device in the retail area, the movement of the user determined relative to a plurality of defined locations in the retail area.

In Example 33, the subject matter of any one of Examples 25 to 32 may include, wherein the plurality of defined locations in the retail area respectively correspond to a plurality of product department zones mapped for the retail area, wherein tracking movement of the user includes tracking movement of the user among the plurality of product department zones.

In Example 34, the subject matter of any one of Examples 25 to 33 may include, wherein the user associated with the mobile computing device is a customer, wherein the mobile computing device is a smartphone of the customer, and wherein the one or more interactions of the mobile computing device with the broadcasting device located in the retail area occur in response to shopping activity by the user in the retail area.

In Example 35, the subject matter of any one of Examples 25 to 34 may include, wherein the identifier unique to the mobile computing device is received in connection with operation of a first software application operating on the mobile computing device, and wherein the media content provided to the mobile computing device is displayed in connection with operation of a second software application operating on the mobile computing device.

In Example 36, the subject matter of any one of Examples 25 to 35 may include, wherein determining the position of the mobile computing device is assisted by information obtained from one or both of a Bluetooth beacon or a Near Field Communication (NFC) device, the Bluetooth beacon operating according to a standard from a Bluetooth standards family, and the NFC device operating according to an exchange of data with a Radio Frequency Identifier (RFID) device.

In Example 37, the subject matter of any one of Examples 25 to 36 may include, wherein the media content delivered to the mobile computing device is further customized based on a customer profile associated with a user of the mobile computing device, the customer profile maintained by a retail operator entity.

In Example 38, the subject matter of any one of Examples 25 to 37 may be implemented by a machine readable medium including instructions that, when performed by a machine, cause the machine to perform acts of Examples 25 to 37.

In Example 39, the subject matter of any one of Examples 25 to 37 may be implemented by an apparatus comprising means for performing the subject matter of Examples 25 to 37.

Example 40 includes subject matter (such as a device, apparatus, or machine) comprising: a hardware processor and memory; a wireless network communications transceiver; and a device tracking and interaction component implemented using the hardware processor and the memory, the device tracking and interaction component configured to perform operations that: receive, from a mobile computing device, an identifier unique to the mobile computing device; determine a position of the mobile computing device in a retail area; associate the identifier unique to the mobile computing device with the position of the mobile computing device in the retail area; and provide information for the position in the retail area to the media network.

In Example 41, the subject matter of Example 40 may include, wherein the device tracking and interaction component is configured to communicate with a mobile computing device, the mobile computing device configured to establish a wireless network connection with the computing system according to a wireless fidelity (Wi-Fi) network standard from an IEEE 802.11 standards family.

In Example 42, the subject matter of any one of Examples 40 to 41 may include, wherein the identifier unique to the mobile computing device is a MAC address, and wherein the device tracking and interaction component is configured to triangulate and track the position of the mobile computing device on an ongoing basis based on measurements performed with communications that include the MAC address.

In Example 43, the subject matter of any one of Examples 40 to 42 may include, the device tracking and interaction component further configured to perform operations that: receive an identified position of the mobile computing device relative to a fixed display in the retail area, the fixed display including an Bluetooth beacon operating according to a standard from a Bluetooth standards family.

In Example 44, the subject matter of any one of Examples 40 to 43 may include, the device tracking and interaction component also configured to perform operations that: receive an identified position of the mobile computing device relative to a fixed display in the retail area, the fixed display including an NFC device operating according to an exchange of data from a Radio Frequency Identifier (RFID) device.

Additional examples of the presently described method, system, and device embodiments include the configurations recited by the claims. Each of the examples in the claims may stand on its own, or may be combined in any permutation or combination with any one or more of the other examples provided below or throughout the present disclosure.

What is claimed is:

1. A method for obtaining location-selected content for a user from a media content network, the method performed by a mobile computing device, and the method comprising:
    transmitting, from a first software application of the mobile computing device to a device tracking system, an identifier unique to the mobile computing device, wherein the device tracking system collects location data for the mobile computing device at a time that the mobile computing device is located within a tracked physical environment;
    transmitting, from a second software application of the mobile computing device to a media content network system, the identifier unique to the mobile computing device, wherein the identifier is transmitted to the media content network system at a subsequent time that the mobile computing device is located outside of the tracked physical environment;
    receiving, with the second software application of the mobile computing device from the media content network system, media content selected for the mobile computing device, wherein the media content network system selects the media content for the mobile computing device based on the identifier unique to the mobile computing device, wherein the media content network system further selects the media content for the mobile computing device based on activity information of the user determined from the tracked physical environment by the device tracking system; and
    displaying the media content selected for the mobile computing device in the second software application, wherein the displaying of the media content in the second software application occurs at the subsequent time that the mobile computing device is located outside of the tracked physical environment;
    wherein the activity information of the user in the tracked physical environment is communicated from the device tracking system to the media content network system independently of the mobile computing device, and wherein the activity information of the user in the tracked physical environment is determined by the device tracking system based on the location data.

2. The method of claim 1, comprising:
    transmitting, from the mobile computing device to the device tracking system, the location data for the mobile computing device, wherein the location data is obtained by the mobile computing device within the tracked physical environment.

3. The method of claim 2, comprising:
    retrieving a unique location identifier from a wireless personal area network beacon or an RFID tag;
    wherein the location data transmitted to the device tracking system includes the unique location identifier.

4. The method of claim 2, comprising:
    receiving network information from a plurality of Wi-Fi wireless local area network access points operating according to a wireless local area network protocol;
    wherein the location data transmitted to the device tracking system includes the network information from the plurality of wireless local area network access points, and wherein the network information includes identifying data to triangulate or trilaterate the mobile computing device in the tracked physical environment relative to the plurality of wireless local area network access points.

5. The method of claim 1, wherein transmitting the identifier unique to the mobile computing device includes transmitting the identifier from the mobile computing device to a beacon connected to the device tracking system.

6. The method of claim 1, wherein the tracked physical environment is a retail store, wherein the location data is correlated by the device tracking system to at least one section of the retail store, and wherein the media content is selected for the mobile computing device based on a visit of the mobile computing device within the at least one section of the retail store.

7. The method of claim 6, wherein the media content is further selected by the media content network system for the mobile computing device based on a duration of the visit of the mobile computing device within the at least one section of the retail store.

8. The method of claim 6, wherein the media content is an advertisement, the advertisement further selected for the mobile computing device based on the visit of the mobile computing device within the at least one section of the retail store and at least one additional demographic factor stored for the user of the mobile computing device.

9. The method of claim 1, wherein the media content is an advertisement, and wherein displaying the media content is automatically performed during use of the second software application outside of the tracked physical environment.

10. At least one non-transitory machine-readable storage medium including instructions for obtaining content selected for a user by a content media network, comprising instructions, that when executed by a mobile computing device, cause the mobile computing device to:
    detect, from operation of a first software application on the mobile computing device, a location identifier for a beacon of a tracking system, the location identifier provided as a unique identification of a mapped portion of a physical area, wherein the tracking system collects location data for the mobile computing device at a time that the mobile computing device is located within the mapped portion of the physical area;
    transmit, from the first software application to the tracking system, an identifier unique to the mobile computing device and the location identifier for the beacon;
    transmit, from a second software application of the mobile computing device to the content media network, the identifier unique to the mobile computing device, wherein the identifier unique to the mobile computing device is transmitted to the content media network at a subsequent time that the mobile computing device is located outside of the mapped portion of the physical area;
    receive, with the second software application of the mobile computing device from the content media network, content information that is selected for the mobile computing device based on the identifier unique to the mobile computing device and the location identifier for the beacon, wherein the content media network further selects the content information for the mobile computing device based on activity information of the user determined from activity in the physical area by the tracking system; and provide, for display in the second software application on the mobile computing device, the content information retrieved from the content media network, wherein the display of the content information in the second software application occurs at the subsequent time that the mobile computing device is located outside of the mapped portion of the physical area;

wherein the activity information of the user in the mapped portion of the physical area is communicated from the tracking system to the content media network independently of the mobile computing device, and wherein the activity information of the user in the mapped portion of the physical area is determined by the device tracking system based on the location data.

11. The machine-readable storage medium of claim 10, the instructions further causing the mobile computing device to:

store the location identifier on the mobile computing device; and provide the location identifier to the second software application;

wherein the second software application requests the content information from the content media network using the location identifier.

12. The machine-readable storage medium of claim 10, the instructions further causing the mobile computing device to:

enable display of the content information in the second software application when the mobile computing device is outside of the mapped portion of the physical area.

13. The machine-readable storage medium of claim 10, the instructions further causing the mobile computing device to:

receive, with operation of the first software application, the location identifier for the beacon from a wireless personal area network beacon or an radio frequency identification (RFID) device, the beacon located within the mapped portion of the physical area; and transmit, with operation of the second software application, the location identifier for the beacon to the content media network, wherein the content information is received from the content media network in the second software application in response to transmitting the location identifier for the beacon.

14. The machine-readable storage medium of claim 10, the instructions further causing the mobile computing device to:

receive network information from a plurality of wireless local area network access points operating according to a wireless local area network protocol; and transmit, to the content media network, the network information, wherein the network information is used in triangulation of the mobile computing device in the mapped portion of the physical area relative to the plurality of wireless local area network access points.

15. The machine-readable storage medium of claim 10, wherein the physical area is a retail store, wherein the unique identification of the mapped portion of the physical area is correlated to a section of the retail store, and wherein the content information is selected for the mobile computing device based on a visit of the mobile computing device within the section of the retail store, and wherein the content information is further selected for the mobile computing device based on a duration of the visit of the mobile computing device within the section of the retail store.

16. A mobile computing device operable by a user, comprising:

a processor;

a storage device to provide:

tracking instructions in operation with the processor, the tracking instructions operable with a first software application to transmit, to a device tracking system, data being unique to a visit of the mobile computing device within a tracked physical environment, the data including an identifier unique to the mobile computing device and location data from the tracked physical environment, wherein the device tracking system tracks the location data for the mobile computing device obtained within the tracked physical environment at a time that the mobile computing device is located within the tracked physical environment;

content retrieval instructions in operation with the processor, the content retrieval instructions operable with a second software application to transmit the identifier from the second software application of the mobile computing device to a media content network system, and retrieve media content for the mobile computing device from the media content network system at a subsequent time that the mobile computing device is located outside of the tracked physical environment, wherein the media content is selected for the mobile computing device based on the identifier unique to the mobile computing device and the location data for the mobile computing device within the tracked physical environment; and content display instructions in operation with the processor, the content display instructions operable with the second software application to display the media content within the second software application, wherein the displaying of the media content in the second software application occurs at the subsequent time that the mobile computing device is located outside of the tracked physical environment;

wherein the activity information of the user in the tracked physical environment is communicated from the device tracking system to the media content network system independently of the mobile computing device, and wherein the activity information of the user in the tracked physical environment is determined by the device tracking system based on the location data.

17. The mobile computing device of claim 16, the storage device further to provide device identification instructions in operation with the processor, the device identification instructions operable with the first software application to obtain the identifier unique to the mobile computing device and provide the identifier unique to the mobile computing device to the device tracking system.

18. The mobile computing device of claim 16, the storage device further to provide user identification instructions in operation with the processor, the user identification instructions to provide information to the device tracking system that is unique to the user of the mobile computing device.

19. The mobile computing device of claim 16, the storage device further to provide user profile instructions in operation with the processor, the user profile instructions to provide information to the device tracking system that is unique to a user profile associated with the user of the mobile computing device.

20. The mobile computing device of claim 16, wherein the tracking instructions are further to receive an identifier from a wireless personal area network beacon and transmit the identifier from the wireless personal area network beacon to the device tracking system, the identifier from the wireless personal area network beacon included in the data unique to the visit of the mobile computing device within the tracked physical environment.

21. The mobile computing device of claim 16, the storage device further to provide location identification instructions in operation with the processor, the location identification instructions to calculate a position of the mobile computing device in the tracked physical environment.

22. The mobile computing device of claim 21, wherein the location identification instructions are further to determine a location of the mobile computing device within the tracked physical environment based on wireless local area network positioning triangulation or trilateration of the mobile computing device.

* * * * *